3,786,157
METHOD OF TREATING HYPERGLYCEMIA
Ronald H. Rynbrandt, Portage, and Fredericka L. Schmidt, Kalamazoo, Mich., assignors to The Upjohn Company, Kalamazoo, Mich.
No Drawing. Continuation-in-part of abandoned application Ser. No. 106,590, Jan. 14, 1971. This application Aug. 3, 1972, Ser. No. 277,574
Int. Cl. A61k 27/00
U.S. Cl. 424—317  3 Claims

ABSTRACT OF THE DISCLOSURE

A method of treating hyperglycemia and more specifically diabetes mellitus in mammals e.g. dogs, cats, horses, and humans, with a unit dosage form of exo-tricyclo-alkane-anti-carboxylic acid and esters of the Formula I:

CROSS-REFERENCE TO RELATED APPLICATION

This application is a continuation-in-part of application Ser. No. 106,590, filed Jan. 14, 1971, now abandoned.

BACKGROUND OF THE INVENTION

Field of the invention

The present invention is concerned with the treatment of hyperglycemia, specifically diabetes mellitus, in mammals with a unit dosage form of compounds and compositions having as active agent a compound of Formula I:

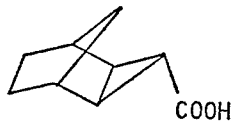

These compounds of Formula I, orally administered directly, or in formulations, in unit dosage form, lower the blood sugar in diabetic mammals including man.

PREFERRED EMBODIMENT OF THE INVENTION

The compounds of Formula I herein shown are depicted in the exo-anti-configuration, i.e. exo referring to the cyclopropane ring being in a cis relation to the methylene bridge and anti meaning the carboxyl group is directed away from the bicyclo system whereas syn is directed toward the bicyclo system. Endo refers to the cyclopropane ring being trans to the methylene bridge and syn and anti having the same meaning as above. As the endo compounds are not orally active antidiabetics, they are not claimed.

The active compounds herein used are disclosed in the art [R. R. Sauers et al., Tetrahedron, 20, 1029 (1964)].

It was now discovered, that exo-tricyclo[3.2.1.0.$^{2,4}$]-octane-3-anti-carboxylic acid and esters as shown above, are useful in the peroral treatment of diabetes mellitus.

In the past diabetes has been alleviated primarily by the use of insulin. Unfortunately, however, insulin cannot be given orally. Thus, the diabetics, before the advent of sulfonylurea therapy for the treatment of diabetes, were faced with a lifetime of insulin injections necessary for the maintenance of bodily health. The novel methods of the present invention provide a means for the relief of diabetes without the necessity of injections. The novel method and compositions are not only capable of reducing blood sugar to a safe level for a considerable period of time but, in addition, also bring about satisfactory blood-sugar reduction. The compounds have moreover desirable sedative effects.

Pharmaceutically effective unit dosages therefore range from about 25–200 mg. per kg. in mammals. Mammals herein include mainly domestic and farm animals, e.g. dogs, cats, horses, cattle, swine, goats; and also man.

All blood sugar determinations were made according to the following procedure:

Glucose-primed, fasted (18–24 hrs.), intact male rats are the test animal. The test compound is administered orally at a dosage of 100 mg./kg. in 0.5 cc. sterile vehicle (6 rats/group). Immediately following administration of the test material, the animals are injected subcutaneously with 125 mg. of glucose in 1 ml. of 0.9% saline. Two hours later the rats are bled, via the vena cava, while under Cyclopal anesthesia, and the blood sugar determined. A significant depression of blood sugar from that of controls indicates activity.

For such oral administration the active compounds can be administered in liquid or solid dosage forms. Solid forms include capsules, tablets, powders, pills, dragées and the like, and liquid forms include suitably flavored aqueous suspensions and solutions (depending on concentration desired), and flavored oil suspension and solutions wherein edible oils, e.g., corn oil, cottonseed oil, coconut oil, peanut oil, sesame oil, sunflower seed oil, or mixtures of these and the like can be employed.

For preparing compositions such as tablets and other compressed formulations, the composition can include any compatible and edible tableting material used in pharmaceutical practice, e.g., corn starch, lactose, stearic acid, magnesium stearate, talc, methyl cellulose, and the like.

Similarly, the compounds of the present invention can be mixed with suitable adjuvants for the preparation of resorbable hard gelatin or soft gelatin capsules utilizing conventional pharmaceutical practices.

The following illustrative compositions are within the scope of the present invention:

EXAMPLE 1

Hard gelatin capsules 10,000 two-piece hard gelatin capsules for oral use, each containing 400 milligrams of active exo-tricyclo [3.2.1.0.$^{2,4}$]octane-3-anti-carboxylic acid are prepared from the following amounts and types of materials:

| | Gm. |
|---|---|
| Exo-tricyclo[3.2.1.0.$^{2,4}$]octane-3-anti-carboxylic acid | 4000 |
| Corn starch | 1616 |
| Mineral oil, U.S.P. | 129.6 |
| Magnesium stearate, powder | 162 |
| Talc, U.S.P. | 162 |

The finely powdered exo-tricyclo[3.2.1.0.$^{2,4}$]octane-3-anti-carboxylic acid is thoroughly mixed with the rest of the ingredients and then capsulated.

EXAMPLE 2

Soft elastic capsules

One piece soft elastic capsules for oral use, each containing 500 milligrams of exo-tricyclo[3.2.1.0.$^{2,4}$]octane-3-anti-carboxylic acid are prepared in the usual manner by first dispersing the active ingredient in sufficient corn oil to render the material capsulatable. One to 4 capsules daily are administered from 1 to 4 times to the diabetic patient.

EXAMPLE 3

Oil suspension

An oil suspension for oral use containing in each 5 milliliters 200 milligrams of exo-tricyclo[3.1.2.0.$^{2,4}$]octane-3-anti-carboxylic acid is prepared from the following types and amounts of materials:

| | | |
|---|---|---|
| Sweetening agent | gm | 3.5 |
| Exo-tricyclo[3.2.1.0.$^{2,4}$]octane-3-anti-carboxylic acid | gm | 400 |
| Preservative | gm | 20 |
| Antioxidant | gm | 1 |
| Flavoring | ml | 25 |
| Aluminum monostearate-corn oil gel, q.s. to 10,000 ml. | | |

Five to 15 ml. of this suspension is administered from 1 to 4 times daily to a diabetic patient.

EXAMPLE 4

Tablet 10,000 oral tablets each containing 500 milligrams of methyl exo-bicyclo[3.2.1.0.$^{2,4}$]octane-3-anti-carboxylate are prepared from the following types and amounts of materials:

| | Gm. |
|---|---|
| Methyl exo-bicyclo[3.2.1.0.$^{2,4}$]octane-3-anti-carboxylate (microencapsulated powder) | 5000 |
| Dicalcium phosphate | 3050 |
| Methylcellulose, U.S.P. (15 cps.) | 65 |
| Talc, bolted | 450 |
| Calcium stearate, fine powder | 35 |

The ingredients are mixed in a conventional manner and compressed into tablets, each containing 500 mg. of active ingredient.

Tablets are generally given from 1 to 5 times daily to the diabetic patient.

EXAMPLE 5

Syrup

A sugar-free syrup for oral use containing in each 5 milliliters 250 milligrams ethyl exo-tricyclo[3.2.1.0.$^{2,4}$]octane-3-anti-carboxylate is prepared from the following types and amounts of materials:

| | | |
|---|---|---|
| Ethyl exo-tricyclo[3.2.1.0.$^{2,4}$]octane-3-anti-carboxylate | gm | 100 |
| Methylparaben, U.S.P. | gm | 3 |
| Sweetening agent | gm | 18 |
| Flavoring | ml | 3 |
| Glycerin | ml | 1500 |
| Deionized water, q.s. to 10,000 ml. | | |

A dose of 2 teaspoonful (10 ml.) to 1 tablespoonful (15 ml.) will give the diabetic patient 150 to 150 mg. of ethyl exo-tricyclo[3.2.1.0.$^{2,4}$]octane-3-anti-carboxylate. One to 3 times daily administration of the above suspension is used for the treatment of diabetes.

The dosage of the compounds of the present invention for the treatment of diabetes depends on the age, weight, and condition of the patient being treated. Generally speaking for adult oral administration the preferred systemic pharmaceutical dosage unit is 25 to 1000 mg. of active compound with a suitable pharmaceutical diluent and/or lubricant. One or two unit dosages are given one to four times a day. A total daily dose of from 25 to 4000 mg. given singly, but preferably in divided doses, embraces the effective range for the treatment of diabetes.

In addition to the foregoing principal active ingredients, the present compositions can also include, as supplementary active ingredients, other blood sugar lowering compounds, such as tolbutamide, chlorpropamide and phenformin. Such supplementary active ingredients can be included in these compositions in amounts approximately equal to or less than the concentrations employed when each material is the sole active ingredients.

EXAMPLE 6

Hard capsules (10,000) are filled with a mixture as follows:

| | Gm. |
|---|---|
| Exo-bicyclo[3.2.1.0.$^{2,4}$]octane-3-carboxylic acid | 1000 |
| Tolbutamide | 2500 |
| Mineral oil | 129.6 |
| Corn starch | 1616 |
| Magnesium stearate, powdered | 162 |
| Talc, U.S.P. | 162 |

A dosage of 2 to 8 capsules per day in 1 to 4 administration is used for diabetics.

The tolbutamide in Example 6 can be replaced by phenformin, tolazamide and the like.

What is claimed is:

1. A method of obtaining blood sugar lowering effects in a mammal suffering from hyperglycemia which consists essentially of administering orally to said mammal in a pharmaceutical dosage unit form of about 25 mg. per kg. to about 200 mg. per kg. of weight of the mammal, of a compound of formula:

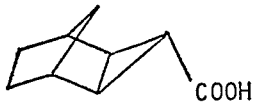

2. The method according to claim 1 wherein the mammals are humans.

3. A method of obtaining blood sugar lowering effects in mammal suffering from hyperglycemia which consists essentially in administering orally to said mammal, in a pharmaceutical dosage unit form supplying an effective nontoxic amount for antihyperglycemic effect, a compound of the formula:

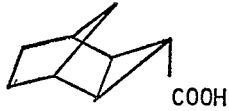

References Cited

Tetrahedron, 20, 1029–1035 (1964).

The Pharmacological Basis of Therapeutics, The Macmillan Co., New York (1965), pp. 1594–1595.

ALBERT T. MEYERS, Primary Examiner

F. E. WADDELL, Assistant Examiner

U.S. Cl. X.R.

424—305